(12) United States Patent
Paulsen et al.

(10) Patent No.: US 9,614,220 B2
(45) Date of Patent: Apr. 4, 2017

(54) DOPED AND ISLAND-COVERED LITHIUM COBALTITE OXIDES

(71) Applicant: Umicore, Brussels (BE)

(72) Inventors: Jens Paulsen, Yuseong-Gu (KR); Maxime Blangero, Cheonan (KR)

(73) Assignee: Umicore, Brussels (BE)

( * ) Notice: Subject to any disclaimer, the term of this patent is extended or adjusted under 35 U.S.C. 154(b) by 0 days.

(21) Appl. No.: 14/855,478

(22) Filed: Sep. 16, 2015

(65) Prior Publication Data

US 2016/0006026 A1    Jan. 7, 2016

Related U.S. Application Data

(63) Continuation-in-part of application No. 13/308,704, filed on Dec. 1, 2011, now Pat. No. 9,177,689, which
(Continued)

(30) Foreign Application Priority Data

Jun. 29, 2007   (EP) .................................... 07012789

(51) Int. Cl.
   *H01M 4/36*      (2006.01)
   *H01M 4/525*     (2010.01)
   (Continued)

(52) U.S. Cl.
   CPC ............ *H01M 4/366* (2013.01); *C01G 51/42* (2013.01); *C01G 53/50* (2013.01); *H01M 4/505* (2013.01);
   (Continued)

(58) Field of Classification Search
   None
   See application file for complete search history.

(56) References Cited

U.S. PATENT DOCUMENTS 6,040,090 A     3/2000  Sunagawa et al.
6,372,385 B1    4/2002  Kweon et al.
(Continued)

FOREIGN PATENT DOCUMENTS

EP    1189296     3/2002
EP     556915     5/2004
(Continued)

OTHER PUBLICATIONS

Paulsen et al., "Core-Shell Cathode Material with Size-Dependent Composition," Electrochemical and Solid-State Letters, vol. 10, No. 4, (2007), pp. A101-A105.

*Primary Examiner* — Lucas J. O'Donnell
(74) *Attorney, Agent, or Firm* — Brinks Gilson & Lione

(57) ABSTRACT

Disclosed is a cathode active material and a method to produce the same at low cost. The cathode powder comprises modified $LiCoO_2$, and possibly a second phase which is $LiM'O_2$ where M' is Mn, Ni, Co with a stoichiometric ratio Ni:Mn≥1. The modified $LiCoO_2$ is Ni and Mn bearing and has regions of low and high manganese content, where regions with high manganese content are located in islands on the surface. The cathode material has high cycling stability, a very high rate performance and good high temperature storage properties.

20 Claims, 5 Drawing Sheets

Related U.S. Application Data is a continuation-in-part of application No. 12/374,532, filed as application No. PCT/EP2008/000313 on Jan. 17, 2008, now Pat. No. 8,785,042, said application No. 13/308,704 is a continuation-in-part of application No. PCT/EP2011/060681, filed on Jun. 27, 2011.

(60) Provisional application No. 61/359,484, filed on Jun. 29, 2010, provisional application No. 60/897,823, filed on Jan. 29, 2007, provisional application No. 60/929,613, filed on Jul. 5, 2007.

(51) Int. Cl.
*H01M 4/505* (2010.01)
*C01G 51/00* (2006.01)
*C01G 53/00* (2006.01)
*H01M 4/02* (2006.01)

(52) U.S. Cl.
CPC ......... *H01M 4/525* (2013.01); *C01P 2002/50* (2013.01); *C01P 2002/52* (2013.01); *C01P 2002/72* (2013.01); *C01P 2004/03* (2013.01); *C01P 2004/52* (2013.01); *C01P 2004/53* (2013.01); *C01P 2004/61* (2013.01); *C01P 2006/11* (2013.01); *C01P 2006/40* (2013.01); *H01M 2004/028* (2013.01); *Y10T 428/2982* (2015.01)

(56) References Cited

U.S. PATENT DOCUMENTS

| | | | |
|---|---|---|---|
| 8,785,042 B2* | 7/2014 | Paulsen | C01G 45/1228 |
| | | | 429/218.1 |
| 9,177,689 B2* | 11/2015 | Paulsen | H01B 1/08 |
| 2006/0071198 A1 | 4/2006 | Paulsen et al. | |
| 2006/0257745 A1 | 11/2006 | Choi et al. | |
| 2007/0218363 A1 | 9/2007 | Paulsen et al. | |
| 2009/0220860 A1 | 9/2009 | Xi et al. | |
| 2010/0112445 A1 | 5/2010 | Park et al. | |

FOREIGN PATENT DOCUMENTS

| | | |
|---|---|---|
| EP | 716609 | 7/2005 |
| JP | 2008-198432 | 8/2008 |
| KR | 20010002784 | 1/2001 |
| WO | WO 2004/040677 | 5/2004 |
| WO | WO 2005/056480 | 6/2005 |
| WO | WO 2005/064715 | 7/2005 |
| WO | WO 2008/092568 | 8/2008 |

\* cited by examiner

DOPED AND ISLAND-COVERED LITHIUM COBALTITE OXIDES

This application is a continuation-in-part of U.S. patent application Ser. No. 13/308,704, filed Dec. 1, 2011, which is a continuation-in-part of U.S. patent application Ser. No. 12/374,532, filed Jan. 21, 2009, which is a national stage application of PCT/EP2008/000313, filed Jan. 17, 2008, which claims the benefit of U.S. Provisional Application No. 60/897,823, filed Jan. 29, 2007, European Patent Application No. 07012789.9, filed Jun. 29, 2007, and U.S. Provisional Application No. 60/929,613, filed Jul. 5, 2007, the entire contents of each of which is hereby incorporated by reference. U.S. application Ser. No. 13/308,704 is also a continuation-in-part of PCT/EP2011/060681, filed Jun. 27, 2011, which claims priority to U.S. Provisional Application No. 61/359,484, filed Jun. 29, 2010, the entire contents of each of which is hereby incorporated by reference.

BACKGROUND OF THE INVENTION

The present invention relates to a powderous lithium transition metal oxide, containing a special type of Mn and Ni bearing $LiCoO_2$. The cathode powder can be prepared at large scale by a low-cost process. More specifically, the preparation is the sintering of a mixture of a cobalt containing precursor, like $LiCoO_2$, a Ni—Mn—Co containing precursor, like mixed hydroxide MOOH, and $Li_2CO_3$. The sintering temperature is high enough to allow for an exchange of cations between the $LiCoO_2$ and Li—Ni—Mn—Co oxide phases being formed, which results in a very specific morphology with a compositional gradient of the different transition metals. The lithium transition metal oxide powder can be used as a cathode active material in rechargeable lithium batteries.

Despite of some inherent limitations like poor safety and high cost $LiCoO_2$ still is the most applied cathode material for rechargeable lithium batteries. There is a strong demand driven by customer expectation to increase the energy density of rechargeable lithium batteries. One way to improve the energy density is to increase the charge voltage, which requires more robust cathode materials which can be charged at higher voltage. Problems which appear or become more severe if the charging voltage is increased are (a) low safety, (b) poor storage properties during storage of charged batteries at elevated temperature and (c) poor cycling stability. Numerous approaches have been disclosed to address these problems. Partial improvements have been achieved but the basic problems have not been fully resolved.

The characterization of phase transitions during charging-discharging, hence as a function of x in $Li_xCoO_2$, has played a central role in the study of this material, as phase changes can introduce irreversibility with repeated charge and discharge. Several investigations have identified phase transitions in layered $Li_xCoO_2$ above 4.3 V. $LiCoO_2$ is isostructural with the rhombohedral R-3m α-$LiFeO_2$ and is referred to as "O3". The O3 structure can be thought of as an ordered rock salt with an oxygen close packing sequence ACBACB and the Co and Li ions forming $CoO_2$ and $LiO_2$ planes of edge-shared octahedra alternately ordered in the (111) direction. When Li is removed a two phase region is observed when x is less than about 0.75. The driving force of the two phase domain is thought to be a Mott-insulating transition from localized spin-holes to metallic-like conductivity when x~0.75. At x=0.5 and V~4.15V, a monoclinic transition occurs driven by Li/vacancy ordering and charge ordering within the $CoO_2$-planes. When more Li is deintercalated; $Li_xCoO_2$ undergoes a cascade of first-order phase transitions with the appearance of a monoclinic H1,3 phase near 4.55V (x~0.2) and eventually the formation of a fully delithiated hexagonal O1 $CoO_2$ phase with ABAB oxygen packing sequence at 4.62V. See for example A. Van der Ven, M. K. Aydinol, and G. Ceder, in *J. Electrochem. Soc.*, 145, 2149 (1998). Such structural transitions at high voltage from O3, H1,3 and O1 induce $CoO_2$ plane-gliding which can eventually result in structural instability during repeated charge and discharge cycling and could be responsible for the poor performances of $LiCoO_2$ in real commercial cells at higher voltages. In particular, several research groups have reported multiple failure mechanism of $LiCoO_2$ at high voltage including impedance growth in the cell, resulting from side reactions involving $LiPF_6$-based electrolytes and initial surface degradation of $LiCoO_2$ particles caused by air or moisture exposure, cobalt leaching and elution, possibly assisted by by-produced HF attack, formation of cubic spinel phase at the $Li_xCoO_2$ particles/electrolyte interface and an increase of dislocations and internal particle strains.

Beside the demand to increase the energy density, it is essential that rechargeable batteries meet the power requirements. That means that the battery as a whole and particularly the active cathode material itself has a sufficient high rate performance. Careful studying of published results on cathode materials allows to better understand the limitations of $LiCoO_2$ based rechargeable lithium batteries. One basic limitation originates from the surface area dilemma. Increasing the rate performance (i.e. high power) can be met by increasing the surface area because the solid-state lithium diffusion length can be decreased; which results in an improved rate performance. However, a high surface area increases the area where unwanted side reactions between electrolyte and charged cathode take place. These side reactions are the cause of poor safety, poor cycling stability at elevated voltage and poor storage properties of charged cathodes at elevated temperature. Furthermore, high surface area materials tend to have a low packing density which reduces the volumetric energy density. Another basic limitation originates from the cobalt stoichiometry. Lithium-nickel-manganese-cobalt oxide based cathode materials (like $LiMn_{1/3}Ni_{1/3}Co_{1/3}O_2$) have higher stability against reactions between electrolyte and cathode than $LiCoO_2$, and the raw material cost is lower, but these materials suffer from a lower volumetric energy density and these materials typically have a lower lithium diffusion constant.

It can be concluded that there exist basic limitations in:
- surface area: Low surface area cathode materials are desired to achieve high safety, improved density and high stability during storage; however, the surface area cannot be lowered too much because this will lower the rate performance, and
- composition: $LiMO_2$ cathodes, where M dominantly is cobalt is desired to achieve high lithium diffusion rate and high volumetric energy density; however a high content of cobalt causes poor safety properties, increased cost and an inferior high voltage stability.

A solution to this dilemma would be to increase the diffusion constant D. A higher value of D would allow to lower the surface area without losing rate performance.

$LiMO_2$, where M=Ni—Mn—Co with Ni:Mn>1, has been previously disclosed. U.S. Pat. No. 6,040,090 (Sanyo), for example, discloses a wide range of compositions including $LiMO_2$ with Ni:Mn>1. The patent application discloses that $LiMO_2$ has a high degree of crystallinity (small FWHM of peaks in the X-ray diffraction pattern). $LiCoO_2$ doped with Ni and Mn has for example been disclosed in U.S. Pat. No. 7,078,128.

It is an object of the present invention to define a cathode material having a high rate performance, and showing high stability during extended cycling at high charge voltage. The high temperature storage properties are also improved.

SUMMARY

Viewed from a first aspect, the invention can provide a powderous lithium metal oxide for a cathode material in a rechargeable battery comprising particles having the general composition $Li_xCo_{1-a-b}M^1{}_aM^2{}_bO_{2-d}$ with $0.97<x<1.01$, $0.005 \le a<0.10$, $0.001 \le b \le 0.02$, and $-0.1 \le d \le 0.1$, wherein $M^1$ is either one or both of Ni and Mn, $M^2$ is either one or more metals from the group consisting of Al, Mg, Ca, Ti, and Zr, wherein the particles comprise a core P2 and a shell P1, wherein P1 consists of a plurality of islands densely sintered to the core P2, wherein the weight ratio P1/P2 is <0.5 and P1+P2=1, wherein the molar content of $M^1$ in P2 is less than in P1, and the molar content of ($M^2$+Co) in P2 is more than in P1. The islands may be discrete and detached from each other. The particles may also only consist of the core P2 and the shell P1. In an embodiment, $0.98 \le x<1.00$. In another embodiment, P1 comprises Co and $M^1$, P2 comprises Co and $M^2$, and the molar content of $M^2$ in P2 is more than in P1. In yet another embodiment, near to the interface between P1 and P2, the molar content of $M^2$ has a gradient-like profile decreasing from b in P2 to below b/2 in P1. It may also be that near to the interface between P1 and P2, the molar content of $M^1$ has a gradient-like profile decreasing from a in P1 to below a/5 in P2. $M^2$ may consist of either one or both of 0.5 to 1.5 mole % Mg and 0.5 to 1.5 mole % Al. In a further embodiment P1 consists of a lithiated oxide of Ni, Co and Mn, with a molar ratio m=Ni/Mn and n=Co/Ni with $1<m<3$ and $0 \le n<1$.

In a different embodiment, the invention can provide a powderous lithium metal oxide for a cathode material in a rechargeable battery comprising particles having the general composition $Li_{x'}Co_{1-a'-b'}M^4{}_{b'}O_{2-d'}$ with $0.97<x'<1.01$, $0.005 \le a'<0.10$, $0.001 \le b' \le 0.02$, and $-0.1 \le d' \le 0.1$, wherein $M^3$ is either one or both of Ni and Mn, $M^4$ is either Al, or Al and either one or more metals from the group consisting of Mg, Ca, Ti, and Zr, wherein the particles comprise a core P2 and a shell P1, wherein P1 comprises Co and $M^3$, wherein P2 comprises Co and Al, wherein P1 consists of a plurality of islands densely sintered to the core and the weight ratio P1/P2 is <0.5 and P1+P2=1, wherein the molar content of $M^3$ in P2 is less than in P1, and the molar content of Al in P2 is more than in P1. In an embodiment, $0.98 \le x<1.00$. The particles may also only consist of the core P2 and the shell P1. In an embodiment the molar content of each of Co and Al in P2 is more than in P1. It may also be that near to the interface between P1 and P2, the molar content of Al has a gradient-like profile decreasing from b' in P2 to below b'/2 in P1. In another embodiment, near to the interface between P1 and P2, the molar content of $M^3$ has a gradient-like profile decreasing from a' in P1 to below a'/5 in P2. $M^4$ may consist of 0.5 to 1.5 mole % Mg and 0.5 to 1.5 mole % Al.

The powder according to the invention may have an electrical conductivity of less than $10^{-5}$ S/cm, preferably less than $10^{-6}$ S/cm or even less than $10^{-7}$ S/cm, when pressed with 63.7 MPa at 25° C. The powder may also have a density of a relaxed pellet that is greater than 3.7 g/cc after applying a pressure of 207 MPa. In a further embodiment, the BET of the powder is lower than 0.3 m²/g. In still another embodiment, during the first charge at C/10 rate in the 4.40V to 4.70V voltage range vs. Li metal the powder has a capacity versus voltage differential ratio dQ/dV<700 mAh/g/V. I may also be that during the first discharge at C/10 rate in the 4.40V to 4.70V voltage range vs. Li metal the powder has a capacity versus voltage differential ratio dQ/dV<2000 mAh/g/V.

It is clear that further product embodiments according to the invention may be provided by combining individual features that are covered by the different product embodiments described before.

DETAILED DESCRIPTION

Figure 1:
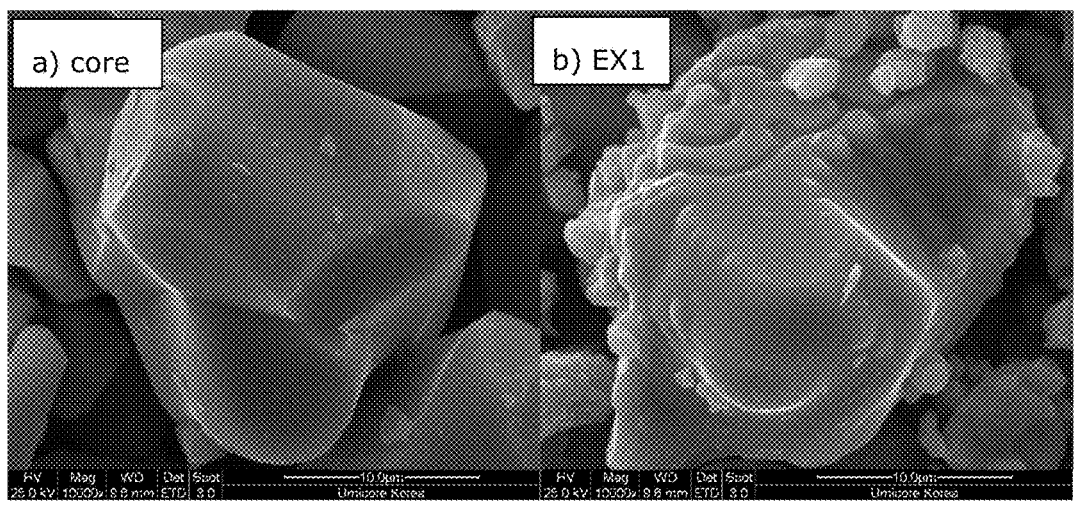
FIG. 1: scanning electron microscope image of Mg and Al doped $LiCoO_2$-based core (1a) and EX1 (1b).

The materials disclosed in the present invention have an improved structural stability at high voltage, especially when charged up to 4.45V and 4.5V against a graphite anode in a full cell (or ~4.5V and ~4.55V against Li metal in a coin cell, respectively). In particular, it has been observed that the metal elution is dramatically suppressed when storage is performed at high voltage and elevated temperature, typically above 45° C. for several days. In this voltage range, conventional $Li_xCoO_2$ is expected to undergo a first order phase transition from O3 to H1,3. The presence of the O1 phase is not excluded in the vicinity of 4.55V vs. Li-metal. A careful study of the charge profile shows that the nature of the O3 to H1,3 transition is significantly affected for the materials of the present invention compared to conventional $LiCoO_2$-based materials. For example, in one embodiment, the O3 to H1,3 to O1 phase transitions during charge and discharge are impaired or suppressed and, as a consequence, the characteristic plateaus on the capacity-V plots and associated peaks on the dQ/dV-V plots of these transitions are decreased or not observed. Preventing the O3 to H1,3 to O1 phase transitions is particularly desirable as internal particle strain during repeated charge and discharge cycles is reduced and the structural stability at high voltage is improved. Authors believe that preventing the H1,3 and O3 transition is a generic approach in order to achieve cobalt-based layered oxides with improved high voltage stability beyond 4.40V vs. a graphite anode. This approach requires doping of the cobalt-based layered oxide for example by Al, Mg, Ti, Mn or Ni as discussed in the following.

The general method to provide the materials according to the invention comprises the steps of:
- providing a first powder consisting of either a doped $LiCoO_2$ powder or a mixture of a cobalt containing precursor compound having a cobalt content of at least 90 mole % and dopant precursors;
- providing a second powder consisting of either a Li—Ni—Mn—Co-oxide or a Ni—Mn—Co precursor powder and optionally a Li-precursor compound, preferably lithium carbonate,
- mixing the first and the second powders,
- sintering the mixture of the first and the second powders at a temperature T of at least 900° C., for a time t between 1 and 48 hrs, so as to obtain Mn and Ni bearing doped $LiCoO_2$ particles having Mn and Ni enriched islands on their surface. The quantity of the dopant precursors is selected to yield a final product comprising less than 5 mole % (versus the final Co+Mn+Ni content) of one or more dopants selected from the group consisting of Al and Mg, and less than 1 mole % (versus the final Co+Mn+Ni content) of one or more dopants selected from the group consisting of Ti, Ca and Zr.

In an embodiment of this method, the Ni—Mn—Co precursor powder is a transition metal hydroxide, oxyhydroxide, carbonate, oxycarbonate, or lithium transition metal compound, in which the transition metal composition M" is $M''=Ni_oMn_pCo_{1-o-p}$, with $o+p>0.5$ and $o>p$. Also, the Ni—Mn—Co precursor powder may comprise between 5 and 70 mole % of the transition metal content of the powderous lithium transition metal oxide. In another embodiment, if the second powder consists of Li—Ni—Mn—Co-oxide, the D50 of this powder is smaller than the D50 of the core doped $LiCoO_2$ particles.

The modified doped LiCoO's morphology has Mn and Ni enriched islands densely sintered to the bulk of the modified doped $LiCoO_2$, causing local gradients of transition metal stoichiometry. The islands contain manganese in high concentration, and have a composition "doped $LiMO_2$", with M=Ni—Mn—Co. Both the doped $LiCoO_2$, as well as the doped $LiMO_2$ particles have a distribution of composition. Additionally, the doped $LiMO_2$ particles have a morphology depending on the cobalt content. The size of primary crystallites increases with cobalt content. Contrary to EP1556915 A1, in the invention there is no radial change of stoichiometry. It is rather a multi-center gradient with the $LiMO_2$ islands, located on the surface and acting as centers of the gradient.

Another aspect of the invention is that the islands do not completely cover the $LiCoO_2$ particles: they are discrete and detached from each other. A complete coverage—with other words—a $LiCoO_2$ core—$LiMO_2$ shell morphology can be achieved by precipitating mixed hydroxide onto the surface of the doped $LiCoO_2$. This approach has been described in patent applications EP1556915 A1 and EP1716609 A1 (Paulsen et al.). The case of the MOOH shell—$LiCoO_2$ core precursor has two major draw-backs, as described in Core-Shell Cathode Material with Size-Dependent Composition, Jens M. Paulsen, Jong-Seok Jeong, and Ki-Young Lee, Electrochem. Solid-State Lett., Volume 10, Issue 4, pp. A101-A105 (2007). (1) The process is more expensive and (2) during sintering more cobalt diffuses from the core into the shell. Thus the shell expands and the core shrinks at the same time. This typically causes a partial separation of the shell from the core, causing large cavities. These large cavities are very undesirable because (i) they increase the porosity of the electrode—thus causing a lower energy density and (ii) they hinder the direct diffusion of lithium across the cavity into or out of the core region of the $LiCoO_2$ particle—thus causing loss of rate performance. The situation is different for the cathode materials of the actual invention. The manganese containing islands cover only a fraction of the surface of the $LiCoO_2$ particle. Therefore the cobalt diffusion induced swelling of the islands and shrinking of the $LiCoO_2$ core does not cause the creation of large cavities. As a result a high volumetric density and a high rate performance can be achieved.

The cathode material of the actual invention is a powder containing modified doped $LiCoO_2$.

The composition can be defined as a doped $Li_xCo_{1-a-b}Ni_aMn_bO_2$ with $0.97<x<1.01$, preferably $0.98\le x<1$, $a\ge b$, $0.03<a+b<0.5$ and preferably $0.1<a+b<0.5$. When $x<1.00$, very good results are obtained, as is shown in the Examples. The formula is idealized and does not take account of small possible deviations like lithium excess or deficiency, oxygen non-stoichiometry or doping as described above. Preferably the doped $LiCoO_2$ based particles are monolithic. A monolithic particle does not exhibit inner porosity, and it does not consist of agglomerates of smaller primary particles. One aspect of the invention is that different particles of the doped modified $LiCoO_2$ have not exactly the same composition. The actual composition of a particle depends on how much nickel and manganese has diffused into the doped $LiCoO_2$ particle during sintering. The Ni and Mn originate from the precursor of the $LiMO_2$ which typically is a mixed hydroxide. The amount of Mn and Ni which diffuses into the $LiCoO_2$ based phase during sintering, besides many other factors like temperature, Li:M ratio, etc., strongly depends on the arrangement of neighboring Ni—Mn based particles and the contact area and contact pressure. As a result, different $LiCoO_2$ particles have a different composition.

Another aspect of the invention is that the metal composition of each single doped $LiCoO_2$ based particle is not homogeneous. Typical particles have an island like surface morphology, the islands originating from smaller Ni—Mn based particles or crystallites, densely sintered to the surface of the doped $LiCoO_2$ particle. The islands have a higher concentration of manganese than the areas further apart from the island, or the regions in the inside of the particle. The existence of the island morphology is an inherent feature of the cathode material of the actual invention. These islands—being centers with higher manganese content—cannot be separated from the particle. They are densely and continuously connected with the bulk of the doped $LiCoO_2$ particle. Hence the manganese stoichiometry—with increasing distance from the island—decreases, possibly in a gradient-like manner and approaches zero in the inside of the particles or on the surface in-between distant islands. The inventors observed that the island morphology is related to the high observed rate performance of the disclosed cathode materials. The authors speculate that the islands—if they were not connected to the doped $LiCoO_2$ particles—would have different crystal lattice constants. However, the island is densely connected to the doped $LiCoO_2$, and between the doped $LiCoO_2$ particle and island a region of manganese stoichiometry gradient exists. Therefore the island as well as the particles will undergo strong lattice strain. The strain somehow—the exact mechanism is unknown to the authors—enables a significantly faster diffusion of lithium into the particle.

The doped $LiCoO_2$ particles have a composition which clearly differs from pure $LiCoO_2$. A large fraction of particles contains at least 3 percent, more preferably 10% of manganese and nickel. Such a change of stoichiometry is usually accompanied by a significant change of lattice constants. However, X-ray diffraction analysis surprisingly shows that the lattice constants of the first phase (obtained from a two-phase Rietveld refinement) basically have not changed—they remain identically to those of $LiCoO_2$.

The inventors understand the reactions which cause the island morphology: during sintering—the sintering of the first and second powders in the general method described before—the NMC precursor reacts with Li to form Li-NMC-$O_2$. However, a significant fraction of these smaller and agglomerated $LiMO_2$ particles is in contact with the doped $LiCoO_2$ particles. The contact points act as cobalt sinks, and manganese containing islands, inherently embedded on the surface of the doped $LiCoO_2$ particle are formed. At the same time, nickel (and some manganese) diffuses into the doped $LiCoO_2$ and cobalt diffuses into the $LiMO_2$ particle, thereby changing the composition from M to M'. During sintering the density of the agglomerated $LiMO_2$ particles, caused by the uptake of cobalt and due to thermal sintering increases. During the densification partially the contact between the swelling island and the LiM'$O_2$ particle may be lost. If there is a surplus of NMC precursor, there is also a surplus of $LiMO_2$ particles, and the final cathode, by the fact that a part of the LiM'$O_2$ particles does not remain as islands on the $LiCoO_2$ cores, but separates from the doped $LiCoO_2$ cores particles, consists of two different phases, as will be further described below.

The loss of contact between $LiMO_2$ and $LiCoO_2$ is easier if the $LiMO_2$ particle is agglomerated. In this case only a part of the $LiMO_2$ particle is consumed and forms the seed for the island. Alternatively, no loss of contact is required if the Ni—Mn—Co precursor has very small particles with a d50 of less than 1-2 micrometer. In this case, a large fraction or even the totality of the Ni—Mn—Co particles is consumed to form the seed of the islands. As a consequence, different implementations of the actual invention are possible.

First typical implementation: it is particularly preferred that the Ni—Mn—Co precursor consists of agglomerated crystallites. A preferred example is a mixed hydroxide, where secondary particles consist of not too dense agglomerates of primary particles. Very dense and large Ni—Mn—Co precursors are less suitable. A preferred particle size distribution has a d50 of 4-8 micrometer. In this case the $LiMO_2$ particles are small enough to (a) support a very high rate and (b) they fit nicely in-between the voids of the larger doped $LiCoO_2$ particles which allows to achieve low porosity electrodes and a high volumetric energy density.

In an embodiment, the precursor for the modified doped $LiCoO_2$ is monolithic, dense and has much larger size than the precursor for the $LiMO_2$ which is agglomerated, less dense and has smaller size. A potential precursor for the modified doped $LiCoO_2$ has dense monolithic particles of at least 10-20 micrometer. Many commercial $LiCoO_2$ materials have this desired morphology. Alternatively, cobalt hydroxide, cobalt oxyhydroxide, cobalt oxide or cobalt carbonate is a suitable precursor if it has large particles (at least 10-20 micrometer) and high density. As an example— cobalt hydroxide or oxyhydroxide with roughly spherical particles and a tap density above 2.0 g/cm$^3$ and a d50 of the particle size distribution larger than 15-20 micrometer is a suitable precursor.

The inventors believe that an essential aspect which causes the formation of the island morphology is the lower mobility of (4 valent) manganese compared to that of 3 valent nickel in $LiCoO_2$ and 3 valent cobalt in $LiMO_2$. Also, the (4 valent) manganese does not take part in the electrochemical insertion/extraction of lithium during charge/discharge of the batteries some of the manganese can be replaced by other cations. A suitable cation is also titanium. Similar to manganese it is electrochemically inert, has low mobility and it can be doped into a Ni—Mn—Co precursor. For example, similar as manganese, titanium can be doped into $LiNiO_2$.

In one embodiment of the invention a high rate performance is achieved even if the cathode material is slightly lithium sub-stoichiometric. We observed that the highest rate performance is achieved if the total lithium content per transition metal was approx. 0.98, i.e. less than unity. This is very surprising, because in the case of lithium transition metal oxides $Li_{1+z}M_{1-z}O_2$ where M contains nickel it is widely accepted that a lithium deficiency causes cation mixing (that are nickel atoms misplaced on crystallographic lithium sites), and the increased cation mixing causes a poor rate performance.

The present invention discloses a strategy to obtain high voltage stable and high rate capable $LiCoO_2$ based cathodes. The obtained $LiCoO_2$ based cathode materials have a high density and can be cycled in a stable manner in real cells at high voltage. A key point of the strategy is to achieve very low electrical conductivity, orders in magnitude lower than reported for other current cathode materials. The lithium metal oxide powder according to the invention has an electrical conductivity of less than $10^{-5}$ S/cm when pressed with 63.7 MPa at 25° C. In certain embodiments the electrical conductivity is less than $10^{-6}$ S/cm, or even less than $10^{-7}$ S/cm. The powder may have a reversible electrode capacity of at least 180 mAh/g, when used as an active component in a cathode which is cycled between 3.0 and 4.5 V vs. $Li^+$/Li at a discharge rate of C/10 at 25° C. In other embodiments the powder has a reversible electrode capacity of at least 180 mAh/g at a discharge rate of C/5 at 25° C., or even at least 180 mAh/g at a discharge rate of 1C at 25° C. In one embodiment the lithium metal oxide powder comprises at least 50 mole % Co, or at least 70 mole % Co, or even at least 90 mole % Co. Measurement of the electrical conductivity is performed under an applied pressure of 63.7 MPa.

The lithium metal oxide powder according to the invention may consist of a core and a shell, wherein the shell has an electrical conductivity being less than $10^{-6}$ S/cm, and preferably less than $10^{-7}$S/cm or even less than $10^{-8}$S/cm, and wherein the conductivity of the shell is less than the conductivity of the core of the lithium metal oxide powder. It is widely accepted that a sufficient electrical conductivity is required when targeting high performance cathode performance. A typical example is the use of carbon coated fine particle $LiFePO_4$. Without carbon coating the capacity and rate performance is very poor. In the case of $LiFePO_4$ a typical target for conductivity of pressed cathode powder is $10^{-3}$ to $10^{-2}$ S/cm. Other cathode materials have relatively high electrical conductivity as well.

The electrical conductivity of different reference materials was measured using pressed pellets at a pressure of 63.7 MPa at room temperature. With a typical electrolyte ionic conductivity of 10 mS/cm ($10^{-2}$ S/cm) we can define cathodes having similar or higher electrical conductivity as being "high conductive"; if the conductivity is greater than to about 1% of that value ($10^{-4}$ S/cm) we define it as "low conductive". If the conductivity is less than 0.1% ($10^{-5}$S/cm) the cathode can be defined as "insulating". It is generally accepted that cathodes must at least have low conductivity, and insulating cathodes cannot work well.

High Ni materials like $LiNi_{0.8}Co_{0.15}Al_{0.05}O_2$ for example have about $3.47*10^{-2}$ S/cm, LMNCO "532" ($LiNi_{0.5}Mn_{0.3}Co_{0.2}O_2$) has about $2.21*10^{-3}$S/cm, "111"

($Li_{1+x}M_{1-x}O_2$ with M=$Ni_{1/3}Co_{1/3}Mn_{1/3}$ and x≅0.05 has about $2.03*10^{-4}$ S/cm. Commercial $LiCoO_2$ has a relatively low electrical conductivity in the range of $10^{-2}$ to $10^{-3}$ S/cm. For all of these cathode materials conductivities above $10^{-5}$ S/cm are measured. Thus none of these cathodes is insulating.

The cathode materials of the present invention are "insulating" using the above described definition. They have conductivities which are at least 2-3 orders lower than those of the least conductive currently known cathode material. It is believed that the low conductivity is the main reason for the high voltage stability of the new insulating cathode materials. That such insulating cathodes can yield excellent electrochemical performance, namely large discharge capacity and rate performance, is a surprise because it is commonly accepted that a certain electrical conductivity is needed for the Li cation diffusion within the solid cathode and across the interface between electrolyte and cathode.

When a $LiCoO_2$ based cathode is charged to high voltage—meaning the cathode is strongly deintercalated—we achieve a $Li_xCoO_2$ composition where most of the Co is in the 4 valent state. Tetravalent $Li_xCoO_2$ is a very strong oxidizer and highly reactive. The electrolyte is thermodynamically not stable in contact with such an oxidizing surface. A reaction with the electrolyte (being the reducing agent) is strongly preferred energetically. Even at low temperature—during normal cycling of a $LiCoO_2$ cathode at high voltage—this reaction proceeds slowly but continuously. Reaction product covers the cathode surface and electrolyte is decomposed, and both effects continuously cause a deterioration of electrochemical performance of the battery; a loss of capacity and a strong increase of resistance—by polarization—is observed.

The situation for high voltage charged cathodes is not so different to those of the well investigated carbon anode. The electrolyte is not stable at the reducing conditions during Li intercalation where the potential is near zero V (versus Li/Li+). Thus the electrolyte decomposes and becomes reduced. In this case, however, the decomposition products of electrolyte with lithium form the so-called SEI (solid electrolyte interface). It is generally accepted that the SEI is an ionic conductor but electronic insulator. Thus the SEI still allows for Li transport across the surface between solid and electrolyte but it prevents further reduction of the electrolyte. The key point is that the reduction of electrolyte locally requires the simultaneous presence of a Li cation as well as an electron. The Li cation is present in the electrolyte and the electron in the carbon bulk. If, however, the SEI, as electronic insulator physically separates the electrons in the carbon from the Li cations in the electrolyte then further electrolyte reduction is not possible.

This mechanism is well known and it has been tried to apply a similar mechanism to the cathode. Much research focused on electrolyte additions which would decompose on the cathode surface to form a cathode SEI. However, the search for electrode additives which form a SEI at high voltage when in contact with a highly oxidized (i.e. delithiated) cathode has been not or only partially successful.

Obviously, an electronically insulating cathode material will solve this problem. If an electronically insulating cathode material could be successfully cycled then we would expect a high voltage stability because the oxidation of the electrolyte requires that an electron is supplied to the cathode. It is however generally assumed up to now that such an insulating cathode could not have good electrochemical performance.

The current invention is based on the discovery that
1) insulating cathodes can have high voltage stability, and
2) it is possible to achieve insulating cathodes which nevertheless show very good electrochemical performances.

Hence, an example pressed powder of the cathode, such as disclosed below, shows very low conductivity, practically being a good insulator. But, surprisingly, the cathode shows excellent electrochemically performance. Furthermore, measurements show that the bulk of the cathode particles is conductive whereas the surface is insulating.

In one embodiment, in order to achieve good performance, the lithium metal oxide powder particles may have the following characteristics:
1) a core-shell structure where the shell is electronically insulating and the core is electronically conducting,
2) an insulating shell that does not cover the core completely, typically much more than 50% but less than 100%, and
3) a shell that dominantly consists of transition metal.

A further important aspect of the invention is that the inner core of the particles has higher conductivity than the outside region. In a typical implementation of the invention the outside is richer in manganese than the inside region. We observe a high electrochemical performance despite that the outside of the doped $LiCoO_2$ particles is covered by a non-conductive shell.

An example morphology of cathodes of the present invention is as follows: a relatively conductive core is mostly, but not to 100%, covered by an insulating shell. Furthermore, the insulating shell dominantly can consist of transition metal oxides where the metal composition comprises at least 95% cobalt, manganese and nickel.

The presence of a core shell structure is however only one of the embodiments of the invention, which is especially observed in powders that have large average particle sizes, such as at least 10 μm, or even at least 20 μm. The claimed process allows obtaining the lowest possible electrical conductivity independently of the obtained structure. By varying the Li:metal blend ratio, cathodes with different electrical conductivity are achieved. The Li:metal ratio according to one embodiment is the ratio which results in minimum electrical conductivity. High voltage stable cathodes are those cathode materials which have the minimum conductivity as function of Li:metal ratio.

The cathode material of the actual invention is a powder, containing the above described doped and island-carrying $LiCoO_2$ and mostly, but not exclusively, the second transition metal phase originating from reacted $LiM'O_2$ particles that detached from the large $LiCoO_2$ core particles. Both phases are lithium-transition-metal oxide phases with a layered crystal structure: ordered rocksalt type crystal structure—space group r-3m. The cathodes can be stoichiometry $Li_1M_1O_2$, with M being cobalt, manganese and/or nickel, or slightly lithium deficient ($Li_{1-x}M_{1+x}O_2$) or lithium rich $Li_{1+x}M_{1-x}O_2$, with x<0.01. The existence of oxygen non-stoichiometry is generally doubted. So the oxygen stoichiometry is approximately 2.0, but it cannot be excluded that the cathodes are slightly oxygen deficient or rich in oxygen. For the sake of simplicity, in the description, the doped Mn and Ni-islands ($LiMO_2$) bearing doped $LiCoO_2$ particles will mostly be referred to as 'phase 1' or also as the 'modified $LiCoO_2$ phase', and an island-free phase having a generalized formula of will $Li_{1+a}M'_{1-a}O_{2\pm b}$ will be referred to as the '$LiM'O_2$' (M'=Ni—Mn—Co and dopants) phase or 'phase 2' of the lithium transition metal oxide. The first phase originates from the doped $LiCoO_2$ precursor and is a modified $LiCoO_2$. The second phase is $LiM'O_2$ with M'=doped $Ni_mMn_nCo_{1-m-n}$, m≥n, 0.1<m+n<0.9. The formula is idealized and does not take account of small possible deviations as lithium excess or deficiency, oxygen non-stoichiometry or doping as described above. The second phase preferably originates from the doped Ni—Mn—Co containing precursor like mixed hydroxide, mixed oxyhydroxide, mixed oxide, mixed lithium metal oxide or mixed carbonate. During the sintering the metal composition of the material yielding the second phase changes. Cobalt diffuses from the core $LiCoO_2$ particles into the shell $LiMO_2$ particles. Some Ni and Mn diffuses out of the $LiMO_2$ particles into the $LiCoO_2$ particles. As a result, the cobalt stoichiometry of the second phase is higher than the cobalt stoichiometry of the Ni—Mn—Co containing precursor. The change of cobalt stoichiometry is an important aspect of the invention. Only if the cobalt stoichiometry increases significantly during sintering, enough exchange of cations has taken place and only in this case the rate performance of the resulting cathode is sufficiently improved. The result is a powderous lithium transition metal oxide comprising a first phase consisting of doped Mn and Ni bearing $LiCoO_2$ particles, carrying the densely sintered islands described before, and a second island-free phase having a generalized formula of $Li_{1+a}M'_{1-a}O_{2\pm b}$ where M'=Ni—Mn—Co and dopants, wherein the first phase originates from a reaction of doped $LiCoO_2$ particles and the second island-free phase.

The inventors have made two more surprising observations:

First observation: The fraction of second phase increases during sintering. Apparently, more cobalt diffuses into the second phase ($LiM'O_2$) than nickel and manganese diffuses into the doped $LiCoO_2$ phase. The inventors speculate that this difference in diffusion enhances the observed island morphology. Related to this observation is a clear change of voltage profile. A mixture of $LiCoO_2$ and $LiM'O_2$ has a characteristic voltage profile with a plateau at 3.88 V. With increased cation exchange the authors observed a disappearing of the 3.88 V plateau together with a lowering of the end-of discharge voltage. Furthermore, cobalt does not only diffuse into the $LiM'O_2$ particles but also into the manganese containing regions on the surface; during this process the areas between the island act as Co source. At the same time the island itself is a cobalt sink. In a simple picture—the manganese containing island swells with cobalt like a sponge would swell by removing water from its surrounding. This process explains why the islands morphology is created.

Second observation: The first phase has a composition which clearly differs from pure (doped) $LiCoO_2$. A large fraction of particles of the first phase contains at least 3 percent, more preferably 10% of manganese and nickel. Such a change of stoichiometry is usually accompanied by a significant change of lattice constants. However, X-ray diffraction analysis surprisingly shows that the lattice constants of the first phase (obtained from a two-phase Rietveld refinement) basically have not changed—they remain identically to those of $LiCoO_2$. The inventors believe that the improvement of rate performance of the first phase is not caused by the creation of a solid state solution between $LiCoO_2$ and $LiM'O_2$. (A solid state solution shows a gradual change of lattice constants depending on the composition.)

A further aspect of the invention is that the $LiM'O_2$ particles (second phase) have crystallites, the size of the crystallites correlates with the cobalt content. Apparently, during sintering, as more Ni (and Mn) diffused away from the $LiMO_2$ into the $LiCoO_2$ particles, and as more Co diffuses into the $LiMO_2$ particles, an acceleration of crystallite growth is caused. As a result, $LiM'O_2$ particles (second phase) with higher cobalt stoichiometry have larger primary crystallites. This is a very useful process because in a self-organized manner, an optimized morphology is achieved. This is because an increased content of cobalt causes a faster lithium diffusion, which allows for larger crystallites without losing rate performance. The correlation between high cobalt content and larger size however only refers to the size of crystallites, not to the size of particles. It is likely that large particles in average have a lower cobalt stoichiometry than small particles, because more cobalt has to diffuse a longer pathway.

The invention may be practiced by way of the different examples described below.

Counter example 1 is a conventional $LiCoO_2$-based material, commercially available from Umicore. Mixed precursors of Co, Mg, Ti, Al and Li are fired in a single step process, resulting in a composition $Li_{1.00}Co_{0.9919}Mg_{0.0035}Ti_{0.0028}Al_{0.0018}O_2$. This sample is labelled CEX1. The average particle size D50 is 16.6 μm and D100 is 52.6 μm. The BET surface area is 0.22 m²/g. The electronic conductivity is $3.7\times10^{-5}$ S/cm at room temperature and under 63.7 MPa. The XRD pattern of CEX1 is shown on FIG. 2 and corresponds to a single phase layered O3 phase with a=2.816 Å and c=14.05 Å with space group R-3m.

EXAMPLE 1

Preparation of the Mg and Al doped $LiCoO_2$-based core: lithium carbonate, tricobalt tetroxide, magnesium carbonate and aluminum oxide are mixed in a molar ratio of 1.05/0.98/0.01/0.01 using a pilot scale equipment. 3.2 kg of the mixture is then put in a 5.9 L mullite sagger and fired at 980° C. for 12 h in an air flow of 4 m³/kg. The sintered cake is milled and classified resulting in a powderous materials with an average particle size D50 of 21.4 μm and a D100 of 71.0 μm, with a general composition of $Li_{1.05}Co_{0.98}Mg_{0.01}Al_{0.01}O_{2\pm\delta}$. Some departure from the oxygen stoichiometry "δ≤0.2" is possible but has not been precisely characterized in the present case. Scanning electron images of the Mg and Al doped $LiCoO_2$-based core is shown on FIG. 1a. The core particles feature a dense potato-shape morphology.

Figure 2:
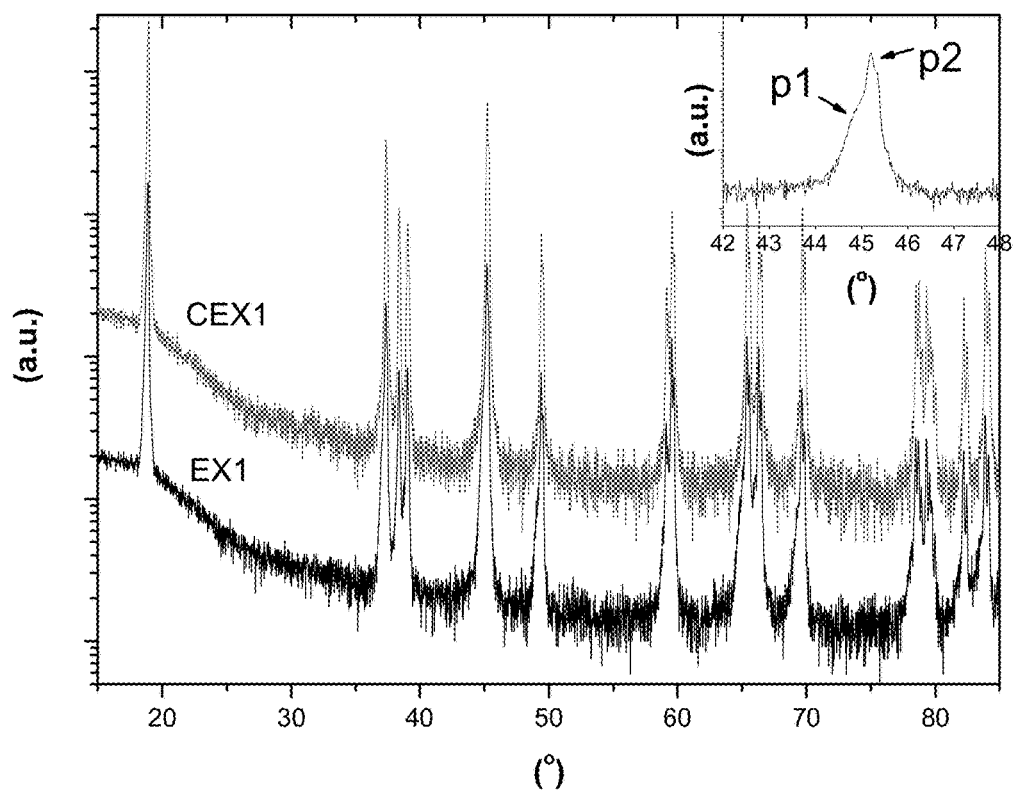
FIG. 2: XRD pattern of CEX1 (upper line) and EX1 (lower line). The insert shows the composite p1 and p2 nature of (104) peak of EX1.

Preparation of the core-shell $LiCoO_2$-based materials. The Mg and Al doped $LiCoO_2$-based core powder is further mixed with a $Ni_{0.55}Mn_{0.30}Co_{0.15}(OH)_2$ powder with a D50 of 3 μm, in a molar ratio of 95/5. 3.0 kg of the mixture is put in a 2.3 L mullite sagger and fired at 1000° C. for 8 h in air. The sintered cake is milled and classified, resulting in a powderous materials with BET surface area of 0.22 m²/g. This sample is labelled EX1. The chemical composition of EX1 is further determined with inductively coupled plasma atomic emission spectroscopy, resulting in a Li, Co, Ni, Mn, Al and Mg molar ratio of 0.990/0.940/0.028/0.015/0.009/0.009, which is in very good agreement with theoretical expectations. The electronic conductivity is determined at $4.5\times10^{-8}$ S/cm at room temperature and under a pressure of 63.7 MPa. The scanning electron image of EX1 is shown on FIG. 1b. EX1 particles have a complex morphology with monolithic particles bearing a plurality of islands densely attached to the particle surface. The X-ray diffraction pattern of EX1 is shown on FIG. 2. The diffracted intensity (arbitrary units) is plotted in logarithmic scale as function of diffracted angle 2θ (in degrees). The XRD pattern is dominated by the characteristic reflections of an O3 phase and no impurity is observed within the detection limit of XRD. All the peaks have a left shoulder suggesting that EX1 is a composite materials of a least 2 O3 phases P1 and P2. For example, the insert on FIG. 2 shows the observed left shoulder of (104) peak of EX1.

The XRD data are further analyzed by means of Rietveld refinement: the P2 phase has lattice parameters a=2.8169 Å and c=14.059 Å, and with the space group R-3m this is very close to the lattice parameters typically observed for LiM"$O_2$-based materials with M" comprising Co, Mg and Al metals. The P1 phase has lattice parameters a=2.8286 Å and c=14.140 Å, with the space group R-3m which is usually observed for $LiMO_2$ O3 phases, with M comprising Ni, Mn, Co, Mg, Al as metal composition. The weight ratio determined by XRD for P1/P2 is 23.4%/76.6%, which exceeds the theoretical 5/95 weight ratio. Finally, the peak broadening is larger for P1 compared to P2, which suggests that the crystallinity of P1 is lower than P2, possibly due to variations in the metal composition.

These observations and findings suggest that the $Ni_{0.55}Mn_{0.30}Co_{0.15}(OH)_2$ compound reacts with the Li-excess of the Mg and Al doped $LiCoO_2$-based core in order to form a plurality of dense $LiMO_2$ particles attached to the surface of the core. Also, the experimental P1/P2 weight ratio is greater than expectation and the crystallinity is less for P1 compared to P2, suggesting (i) that the $LiMO_2$ phase is mostly localized on the surface of the particles and (ii) that substantial metal diffusion occurs—in a gradient-like profile—at the interface between P1 and P2 phases.

Table 1 shows selected electrochemical properties for CEX1 and EX1. DQ7 refers to the discharge capacity between 4.6V and 3.0V at 0.1C (with 1C current of 160 mA/g) at cycle 7, in agreement with the coincell schedule of Table 1 bis. Capacity fadings at 0.1C and 1C are calculated as follows and are expressed in % per 100 cycles:

$$0.1C\ QFad. = \left(1 - \frac{DQ31}{DQ7}\right) \times \frac{10000}{23} \text{ in \%/100 cycles,}$$

$$1C\ QFad. = \left(1 - \frac{DQ32}{DQ8}\right) \times \frac{10000}{23} \text{ in \%/100 cycles.}$$

Energy fadings at 0.1C and 1C are calculated as follows and are expressed in % per 100 cycles.

$$0.1C\ EFad. = \left(1 - \frac{DQ31 \times \overline{V31}}{CQ7 \times \overline{V7}}\right) \times \frac{10000}{23} \text{ in \%/100 cycles,}$$

$$1C\ EFad. = \left(1 - \frac{DQ32 \times \overline{V32}}{CQ8 \times \overline{V8}}\right) \times \frac{10000}{23} \text{ in \%/100 cycles.}$$

where DQn is the discharge capacity at cycle n and $\overline{Vn}$ is the average voltage at cycle n.

Because of the presence of clear H1,3 and O1 transition plateaus, the DQ7 capacity of CEX1 is superior to EX1 by about 10 mAh/g. The capacity and energy fade rates at both 0.1C and 1C are however faster for CEX1 and EX1; this means that the discharge capacity and voltage retention of CEX1 and EX1 cross over and that EX1 retains more capacity and energy after a certain number of cycles. In this case, it is found that the capacity retention at cycle 32 of CEX1 and EX1 is respectively 194.0 and 197.6 mAh/g and that the energy retention is only 773.2 mWh/g for CEX1 comparted to 806.4 mWh/g for EX1. The CQ, DQ and Qirr. Values at 4.7V are also given in Table 1.

TABLE 1

Electrochemical properties (4.6 V and 4.7 V vs. Li-metal) of CEX1 and EX1.

|  | DQ7 (mAh/g) | QFad._ 0.1 C(%) | QFad._ 1 C(%) | EFad._ 0.1 C(%) | EFad._ 1 C(%) | 4.7 V CQ (mAh/g) | 4.7 V DQ (mAh/g) | 4.7 V QIrr. (%) |
|---|---|---|---|---|---|---|---|---|
| CEX1 | 225.3 | 27.7 | 51.5 | 31.2 | 60.6 | 260.6 | 254.5 | 2.4% |
| EX1 | 215.9 | 20.0 | 26.0 | 19.0 | 24.0 | 245.8 | 230.3 | 6.3% |

TABLE 1bis schedule of coincell electrochemical testing at 4.6 V vs. Li-metal.

| | | Charge | | | | Discharge | | | |
|---|---|---|---|---|---|---|---|---|---|
| Type | Cycle number "n" | C Rate | End Current | Rest (min) | V/Li metal (V) | C Rate | End Current | Rest (min) | V/Li metal (V) |
| Part I: | 1 | 0.10 | — | 30 | 4.3 | 0.10 | — | 30 | 3.0 |
| Rate | 2 | 0.25 | 0.05 C | 10 | 4.3 | 0.20 | — | 10 | 3.0 |
| performance | 3 | 0.25 | 0.05 C | 10 | 4.3 | 0.50 | — | 10 | 3.0 |
| 4.3 V-3.0 V | 4 | 0.25 | 0.05 C | 10 | 4.3 | 1.00 | — | 10 | 3.0 |
| | 5 | 0.25 | 0.05 C | 10 | 4.3 | 2.00 | — | 10 | 3.0 |
| | 6 | 0.25 | 0.05 C | 10 | 4.3 | 3.00 | — | 10 | 3.0 |
| Part II: | 7 | 0.25 | 0.1 C | 10 | 4.6 | 0.10 | — | 10 | 3.0 |
| 1 C cycle life | 8 | 0.25 | 0.1 C | 10 | 4.6 | 1.00 | — | 10 | 3.0 |
| 4.6 V-3.0 V | 9-30 | 0.25 | — | 10 | 4.6 | 0.50 | — | 10 | 3.0 |
| | 31 | 0.25 | 0.1 C | 10 | 4.6 | 0.10 | — | 10 | 3.0 |
| | 32 | 0.25 | 0.1 C | 10 | 4.6 | 1.00 | — | 10 | 3.0 |

The samples prepared in Example 1 are subjected to a float storage test method: in a recent technical report of commercially available "3M battery electrolyte HQ-115", a float charging method is used to test the stability of the novel electrolyte at high voltage. The method is carried out by continuously charging LCO/graphite pouch cells or 18650 cells at 4.2 V and 60° C. for 900 hours. The currents recorded under charge are compared. A higher current reflects more side reactions that occur, so this test method is able to identify parasite reactions occurring in a battery at high voltage. In "*Energy Environ. Sci.*, 6, 1806 (2013)", a similar float charging method is used to evaluate the stability of electrolyte against oxidation under high voltage from 5V and up to 6.3V vs. Li metal. Based on the above knowledge, by choosing a relatively stable electrolyte and anode material for the required charging voltage, float charge methods can be used to study the stability of cathode materials under high voltage, where the metal dissolution from the cathode materials can be reflected by the leakage current. In addition, in "Nature Comm., 4, 2437 (2013)", the dissolved manganese from lithium manganese oxide cathodes is shown to be deposited on the surface of the anode in metal or metal alloy form, and the deposited amount can be detected by inductively coupled plasma-atomic absorption spectrometry ICP-AAS, or by ICP-OES. These ICP experiments on the anode can also be used to study the metal dissolution issue of lithium cobalt oxide-based material. Therefore, the float charge method associated with ICP measurement (referred to hereafter as "floating experiment") is a feasible way to evaluate the side reaction and metal dissolution of lithium cobalt oxide-based cathode materials at high voltage and elevated temperature. In the present study, floating experiments are performed in order to evaluate the stability of the cathode materials at high voltage charging and at elevated temperature (50° C.).

In some embodiments, the tested cell configurations are coin cells that are assembled as follows: two separators (from SK Innovation) are located between a positive electrode (previously described) and a negative graphite electrode (Mitsubishi MPG). The electrolyte is 1M LiPF$_6$ in EC/DMC (1:2 volume ratio) solvents. For the floating test, the prepared coin cells are submitted to the following charge protocol: the coin cell is firstly charged to a defined upper voltage (4.45V or 4.5V vs. graphite) at constant current mode with a C/20 rate taper current (with 1C=160 mAh/g), then is kept constant at 4.45V or 4.5V voltage (CV-mode) for 120 hours at 50° C. After the floating experiment, the coin cell is disassembled. The anode and the separator in contact with the anode are analyzed by ICP-OES for metal dissolution analysis. Float storage data for EX1 and CEX1 are shown on Table 2. EX1 delivers lower float capacity and lower Ni, Mn and Co metal elution during float storage compared to CEX1 at 4.45V. In addition, EX1 is submitted to float storage at 4.5V and still retain about 4 times lower metal elution than CEX1 at 4.45V.

Figure 3:
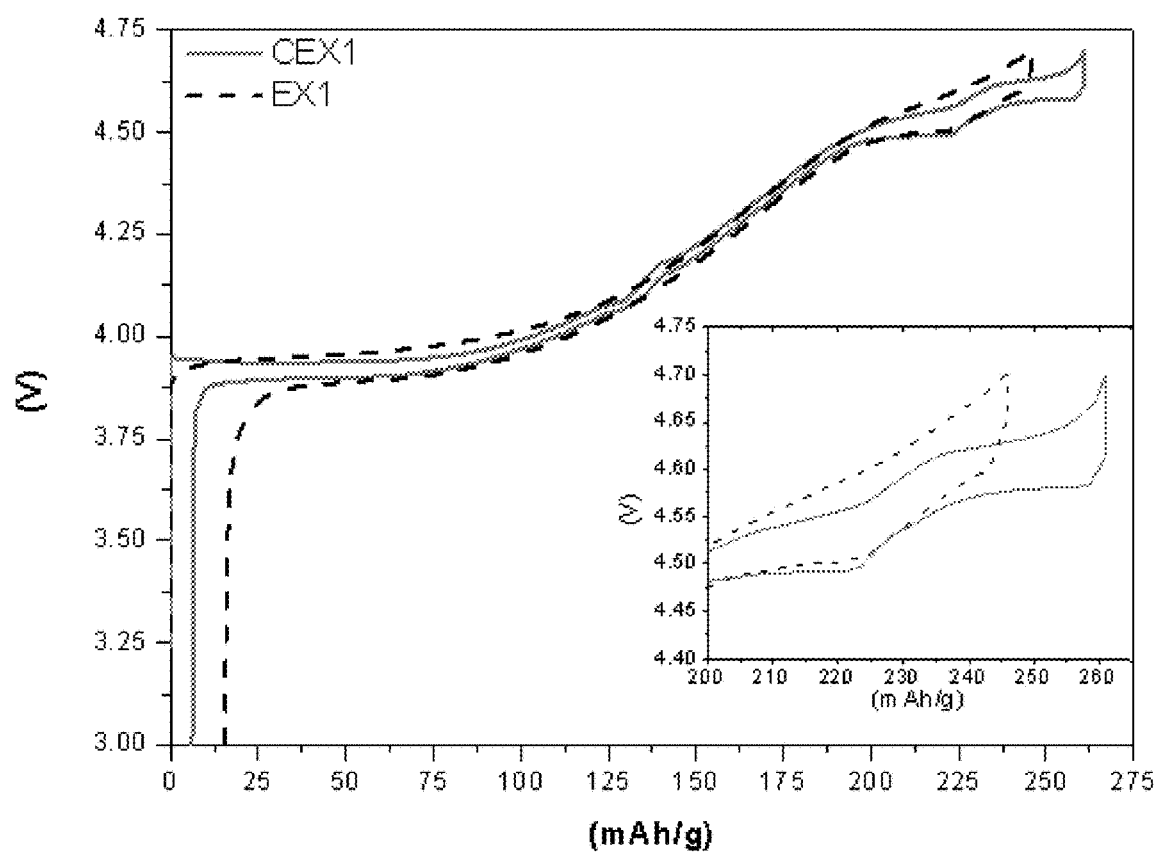
FIG. 3: Evolution of cell voltage (in V vs. Li-metal) as function of capacity (in mAh/g) for CEX1 and EX1 in the 4.70-3.0V range.

The samples are submitted to a dQ/dV experiment during charge and discharge. FIG. 3 shows the voltage (vs. Li-metal) as a function of capacity for the first charge and discharge cycle of CEX1 and EX1 in the 4.70V-3.0V (vs. Li-metal) range. The charge and discharge is done at C/10 rate with 1C=160 mA/g current definition. Data points are recorded every 600 seconds (time interval) and/or every 100 mV voltage change and/or every 0.1 mA current change. The charge profiles of both materials are very different. The CEX1 charge curve shows two small plateaus near 4.15V, corresponding to the order-disorder phase transition (at x-0.5) and the two plateaus at 4.55V and 4.63V, which correspond to the 2-phase transitions from the O3 phase to the H1,3 phase and then to the O1 phase. For EX1 however, it is difficult to observe any plateaus in the charge curve and also, as shown on the insert of FIG. 3, a significant higher polarization in the vicinity of the high voltage H1,3 and O1 transitions is reported. The charge capacities at 4.70V are also different for both materials, i.e. lower by about 15 mAh/g for EX1 compared to CEX1, showing that less Li is extracted in EX1 compared to CEX1, which is believed to be due to the increased polarization at high voltage. The discharge portions of the voltage-capacity curves for the two samples are also quite different. For CEX1, all the plateaus observed during charge have counterparts in the discharge curve. For EX1, no plateau is observed at both circa 4.6V and 4.1V; a complex plateau is observed near 4.5V though.

The dQ/dV differential values are numerically calculated by averaging the slopes of two adjacent points for each $(V_i, Q_j)$ data point as follows:

$$\left(\frac{dQ}{dV}\right)_{V=V_i} \sim \frac{\Delta Q_i}{\Delta V_i} = \frac{1}{2}\left(\frac{Q_{i+1} - Q_i}{V_{i+1} - V_i} + \frac{Q_i - Q_{i-1}}{V_i - V_{i-1}}\right).$$

Figure 4:
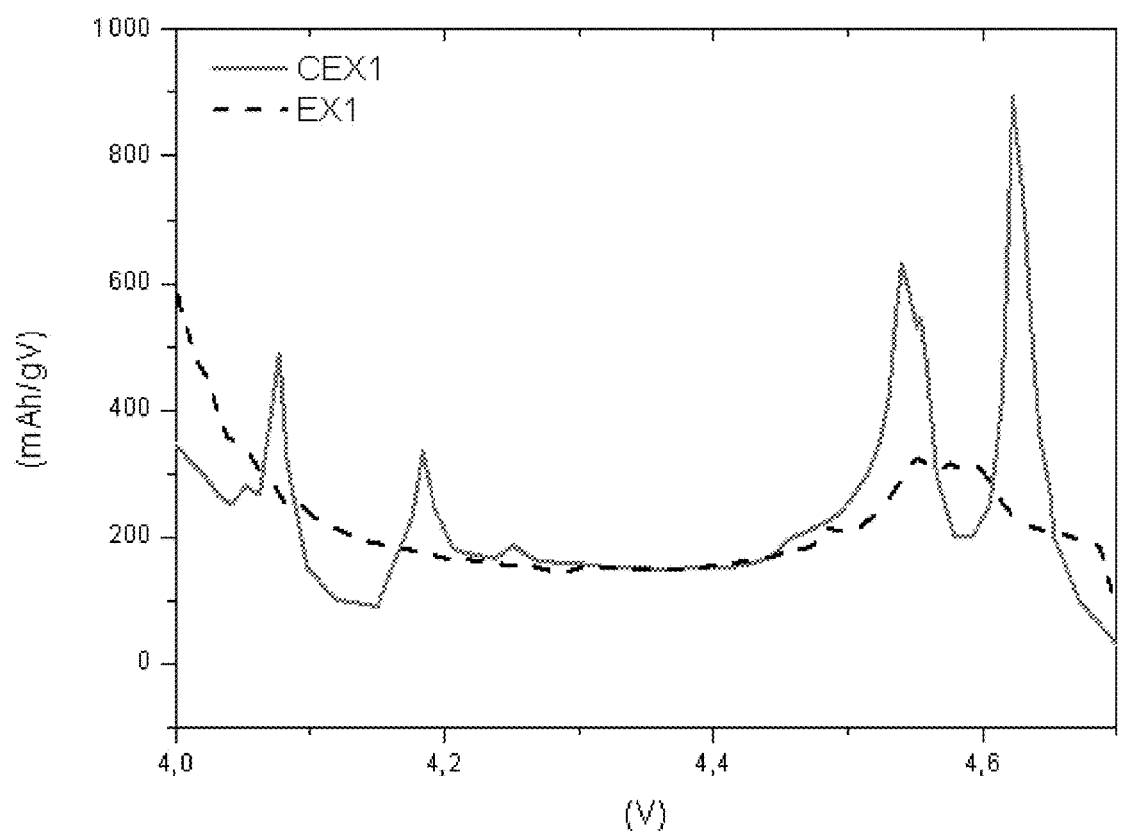
FIG. 4: Evolution of the absolute value of the differential capacity dQ/dV (in mAh/g/V vs. Li-metal) as function of cell voltage (in V vs. Li-metal) for CEX1 and EX1 during the first charge between 3.0 and 4.70V.

When the differential capacity dQ/dV is plotted as a function of the cell potential, plateaus in voltage-capacity curves appear as peaks. FIG. 4 shown the absolute value of the dQ/dV as a function of voltage (vs. Li-metal) during the first charge for CEX1 and EX1. Above 4.3V, the charge curve of CEX1 has two peaks at 4.55V and 4.63 V, respectively. These two peaks with dQ/dV-631 mAh/g/V and 891 mAh/g/V respectively, and corresponding to the highest two plateaus in the charge curves in FIG. 3, represent the phase transitions from the O3 phase to the H1,3-phase, and then to the O1 phase. These two phase transitions are very difficult to observe for EX1 and, above 4.3V, dQ/dV320 mAh/g/V.

Figure 5:
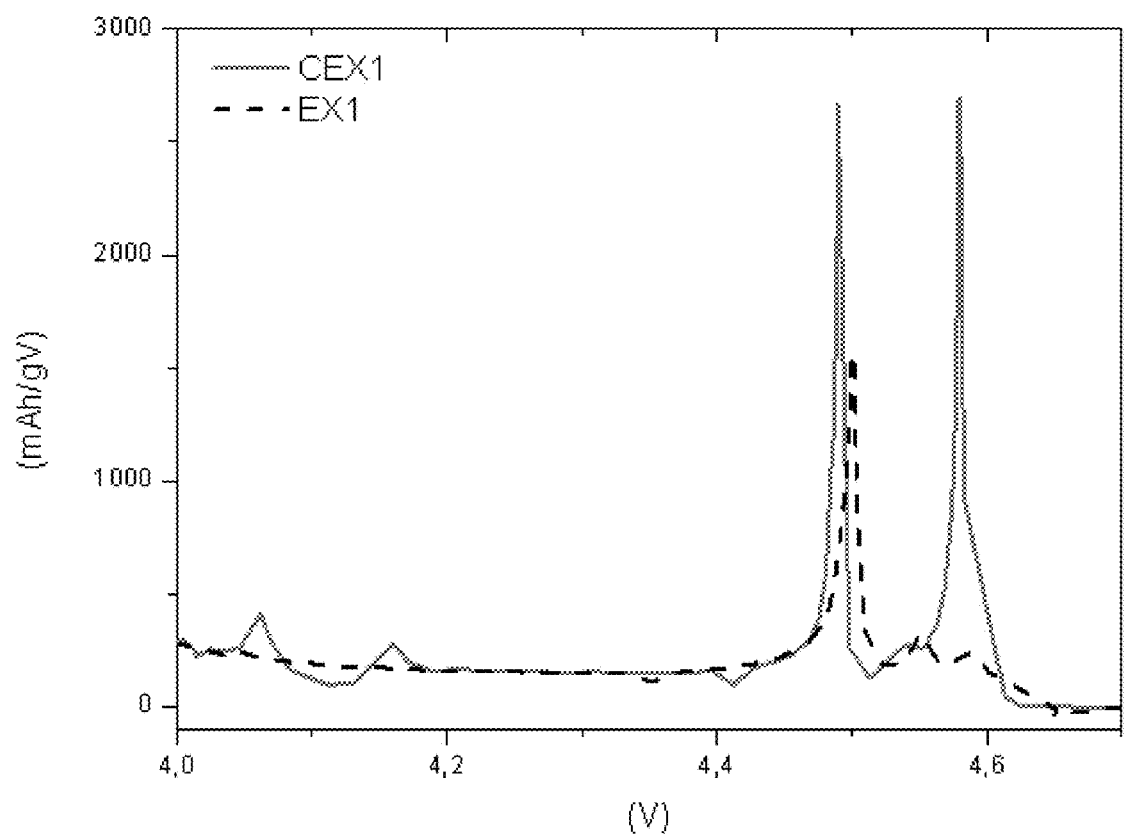
FIG. 5: Evolution of the absolute value of the differential capacity dQ/dV (in mAh/g/V vs. Li-metal) as function of cell voltage (in V vs. Li-metal) for CEX1 and EX1 during the first discharge between 3.0 and 4.70V.

FIG. 5 shows the absolute value of the dQ/dV as a function of voltage (vs. Li-metal) during the first discharge for CEX1 and EX1. As expected, CEX1 shows two peaks in the discharge part of the dQ/dV curve that correspond to the reverse reactions of the 4.55 and 4.63V peaks in the charge curves. The absolute value of the dQ/dV are respectively for these two peaks 2689 mAh/g/V at −4.58V and 2666 mAh/g/V at 4.49V. For EX1 however, only a weak peak is observed near 4.50V with a maximum of 1559 mAh/g/V,

TABLE 2

| | Floating storage data of CEX1 and EX1 at 4.45 V and 4.50 V (vs. graphite anode). | | | | | | | |
|---|---|---|---|---|---|---|---|---|
| | QFloat__ 4.45 V (mAh/g) | Co__ 4.45 V (mg) | Ni__ 4.45 V (mg) | Mn__ 4.45 V (mg) | QFloat__ 4.5 V (mAh/g) | Co__ 4.5 V (mg) | Ni__ 4.5 V (mg) | Mn__ 4.5 V (mg) |
| CEX1 | 163.4 | 0.504 | — | — | — | — | — | — |
| EX1 | 73.0 | 0.076 | 0.002 | 0.001 | 95.3 | 0.127 | 0.004 | 0.003 | about 58% of the peak maximum observed for CEX1. This finding suggests that the nature of the H1,3 and O1 transitions are strongly affected and suppressed in EX1—compared to CEX1.

EXAMPLE 2

This example will demonstrate a synergetic effect between Al doping and the core-shell structure of the $LiCoO_2$-based materials. Preparation of EX2 cathode material: 1 mol % Mg-doped lithium cobalt oxide with dense and monolithic morphology and with a D50 of about 20 μm is prepared at pilot scale in a similar way as for EX1, but without addition of an Al precursor. The Mg-doped $LiCoO_2$-based core powder is further mixed with a $Ni_{0.55}Mn_{0.30}Co_{0.15}(OH)_2$ powder with a D50 of 3 μm in a molar ratio of 95/5. 3.0 kg of the mixture is then put in a 2.3 L mullite sagger and fired at 1000° C. for 8 h in air. The sintered cake is milled and classified, resulting in a powderous materials with a BET surface area of 0.19 $m^2/g$. This sample is labelled EX2. The chemical composition of EX2 is further determined with inductively coupled plasma atomic emission spectroscopy, resulting in a Li, Co, Ni, Mn and Mg molar ratio of 0.99/0.947/0.028/0.015/0.010, which is in very good agreement with theoretical expectations. The electronic conductivity is $5.2 \times 10^{-8}$ S/cm at room temperature and under 63.7 MPa. The density of the relaxed pellet is 3.87 g/cc after applying a pressure of 207 MPa.

Preparation of EX3 cathode material: 1 mol % magnesium Mg and 0.5 mol % Al doped lithium cobalt oxide with dense and monolithic morphology and with a D50 of about 20 μm is prepared at pilot scale in a similar way as for EX1. The Mg and Al doped $LiCoO_2$-based core powder is further mixed with $Ni_{0.55}Mn_{0.30}Co_{0.15}(OH)_2$ powder with a D50 of 3 μm in a molar ratio of 95/5. 3.0 kg of the mixture is then put in a 2.3 L mullite sagger and fired at 1000° C. for 8 h in air. The sintered cake is milled and classified resulting in a powderous materials with BET surface area of 0.24 $m^2/g$. This sample is labelled EX3. The chemical composition of EX3 is further determined with inductively coupled plasma atomic emission spectroscopy, resulting in a Li, Co, Ni, Mn, Al and Mg molar ratio of 0.98/0.943/0.028/0.015/0.005/0.009, which is in very good agreement with theoretical expectations. The electronic conductivity is $4.5 \times 10^{-8}$ S/cm at room temperature and under 63.7 MPa. The density of the relaxed pellet is 3.80 g/cc after applying a pressure of 207 MPa.

Figure 6:
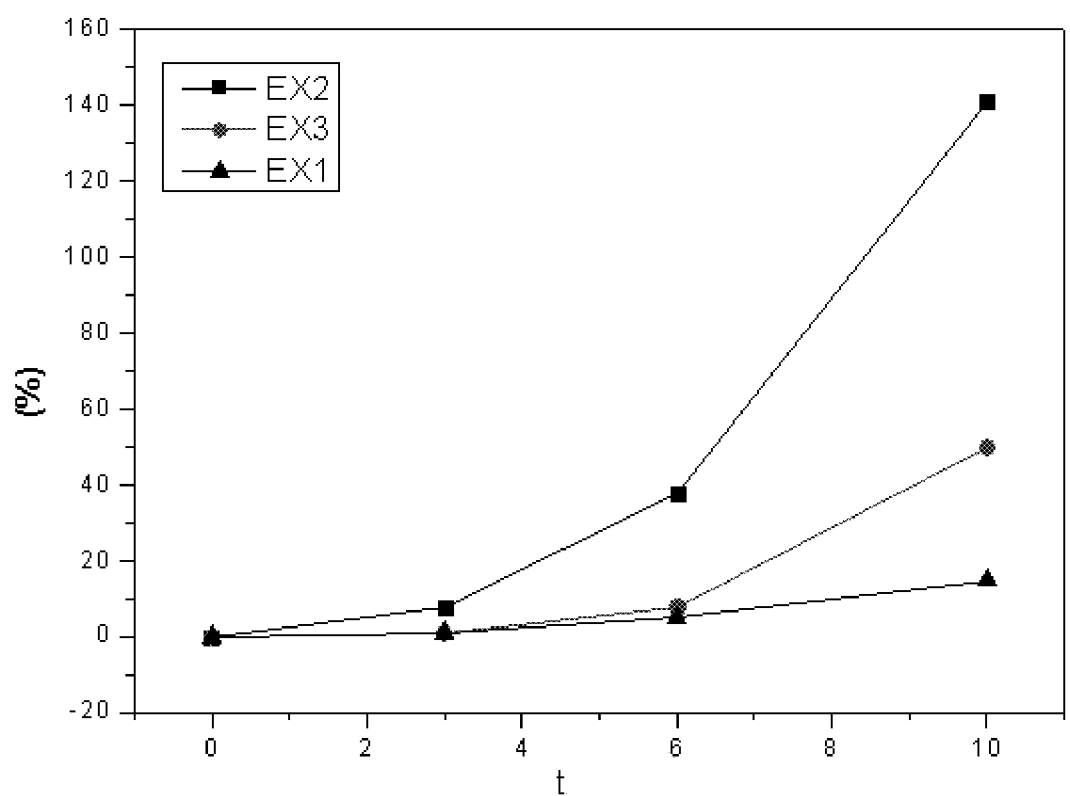
FIG. 6: Evolution (time in days) of pouch cell thickness (in %) as function of float current constant voltage storage at 4.35V and 60° C.

EX1, EX2 and EX3 samples are fitted into 800 mAh pouch cells (length×width×depth=50×34×3.8 $mm^3$). The cathode slurry is prepared by mixing 96 wt % of resp. EX1, EX2 and EX3 cathode active materials, 1 wt % Super-P (Timcal), 1wt % KS-6 graphite (Timcal), 2 wt % KF1700 PVDF binder solution in NMP solvent (Kureha) and by adding an appropriate amount of NMP solvent (Mitsubishi chemical electronics grade). The cathode slurry is then two-side coated on an aluminum foil. The typical cathode electrode density is 3.8 to 3.9 g/cc. The graphite anode is prepared with natural graphite coated on copper foil, the loading weight being 8 $mg/cm^2$ and the density 1.5 mg/cc. The separator is commercially available from Asahi, with reference NH312. The electrolyte is commercially available from PanaxEtec with a mixture of EC/DMC=30/70 vol./vol. ratio with 1M $LiPF_6$ salt concentration and 2 vol % VC additive. The pouch cells are pre-charged, degassed, sealed and undergo a formation process in order to be used at an operating voltage of 4.35V vs. graphite (~4.40V vs. Li-metal). The as-prepared cells are subjected to a float-current constant voltage storage at 4.35V and 60° C. for 10 days with a maximum current of 100 mA. The cell thickness is recorded after 3, 6 and 10 days storage. The evolution of cell thickness for cells fitted with EX1, EX2 and EX3 cathode materials is shown on FIG. 6, where the evolution over time (t: in days) of pouch cell thickness (in % of the original thickness) during a float current constant voltage storage at 4.35V and 60° C. After 10 days storage, the thickness increase is respectively 141%, 50% and 15% for EX2, EX3 and EX1. The mechanism for cell thickness increase results from the gas generation inside the cell due to side reactions with the electrolyte at high voltage, or other parasitic reactions such as structural instability of cathode materials at high voltage, resulting in metal elution and decomposition of the anode SEI. The experiment is a key experiment to assess the applicability of cathode materials to demanding consumer electronic applications. This result shows that EX3 and EX1 are suitable for application in Li-ion pouch cells and that EX2 is not, because of the excessive gas generation leading to unsafe operation of the battery. It is believed that the presence of aluminum doping generates less side reactions with the electrolyte and provides an enhanced structural stability at high voltage for EX1 and EX3 cathode materials.

The invention claimed is:

1. A powderous lithium metal oxide for a cathode material in a rechargeable battery comprising particles having the general composition $Li_xCo_{1-a-b}M^1_aM^2_bO_{2-d}$ with $0.97<x<1.01$, $0.005 \le a<0.10$, $0.001 \le b \le 0.02$, and $-0.1 \le d \le 0.1$, wherein $M^1$ is Ni and Mn, $M^2$ is either one or more metals from the group consisting of Al, Mg, Ca, Ti, and Zr, wherein the particles comprise a core P2 and a shell P1 wherein P1 consists of a plurality of islands densely sintered to the core P2, wherein the weight ratio P1/P2 is <0.5 and P1+P2=1, wherein the molar content of $M^1$ in P2 is less than in P1, and the molar content of $(M^2+Co)$ in P2 is more than in P1; and wherein P2 comprises at least 3 mole % of Ni and Mn and is a $LiM''O_2$-based material with M" comprising Co and $M^2$, and P1 is a $LiMO_2$ based material with M comprising Co, $M^1$ and $M^2$.

2. A powderous lithium metal oxide for a cathode material in a rechargeable battery comprising particles having the general composition $Li_{x'}Co_{1-a'-b'}M^3_{a'}M^4_{b'}O_{2-d'}$ with $0.97<x'<1.01$, $0.005 \le a'<0.10$, $0.001 \le b' \le 0.02$, and $-0.1 \le d' \le 0.1$, wherein $M^3$ is Ni and Mn, $M^4$ is either Al, or Al and either one or more metals from the group consisting of Mg, Ca, Ti, and Zr, wherein the particles comprise a core P2 and a shell P1, wherein P1 comprises Co and $M^3$, wherein P2 comprises Co and Al, wherein P1 consists of a plurality of islands densely sintered to the core and the weight ratio P1/P2 is <0.5 and P1+P2=1, wherein the molar content of $M^3$ in P2 is less than in P1, and the molar content of Al in P2 is more than in P1; and wherein P2 comprises at least 3 mole % of Ni and Mn and is a $LiM''O_2$-based material with M" comprising Co and $M^4$, and P1 is a $LiMO_2$ Based material with M comprising Co, $M^3$ and $M^4$.

3. The powderous lithium metal oxide of claim 1, wherein the molar content of $M^2$ in P2 is more than in P1.

4. The powderous lithium metal oxide of claim 2, wherein the molar content of each of Co and Al in P2 is more than in P1.

5. The powderous lithium metal oxide of claim 1, wherein near to the interface between P1 and P2, the molar content of $M^2$ has a gradient-like profile decreasing from b in P2 to below b/2 in P1.

6. The powderous lithium metal oxide of claim 1, wherein near to the interface between P1 and P2, the molar content of $M^1$ has a gradient-like profile decreasing from a in P1 to below a/5 in P2.

7. The powderous lithium metal oxide of claim 2, wherein near to the interface between P1 and P2, the molar content of Al has a gradient-like profile decreasing from b' in P2 to below b'/2 in P1.

8. The powderous lithium metal oxide of claim 2, wherein near to the interface between P1 and P2, the molar content of $M^3$ has a gradient-like profile decreasing from a' in P1 to below a'/5 in P2.

9. The powderous lithium metal oxide of claim 1, wherein $0.98 \leq x<1.00$.

10. The powderous lithium metal oxide of claim 2, wherein $0.98 \leq x'<1.00$.

11. The powderous lithium metal oxide of claim 1, wherein the lithium metal oxide has an electrical conductivity of less than $10^{-5}$ S/cm when pressed with 63.7 MPa at 25° C.

12. The powderous lithium metal oxide of claim 1, wherein $M^2$ consists of either one or both of 0.5 to 1.5 mole % Mg and 0.5 to 1.5 mole % Al.

13. The powderous lithium metal oxide of claim 2, wherein $M^4$ consists of 0.5 to 1.5 mole % Mg and 0.5 to 1.5 mole % Al.

14. The powderous lithium metal oxide of claim 1, wherein P1 consists of a lithiated oxide of Ni, Co and Mn, with a molar ratio m=Ni/Mn and n=Co/Ni with $1<m<3$ and $0 \leq n<1$.

15. The powderous lithium metal oxide of claim 1, wherein the density of a relaxed pellet is greater than 3.7 g/cc after applying a pressure of 207 MPa on the powder.

16. The powderous lithium metal oxide of claim 1, wherein the BET is lower than 0.3 $m^2$/g.

17. The powderous lithium metal oxide of claim 1, having a capacity versus voltage differential ratio dQ/dV<700 mAh/g/V in the 4.40V to 4.70V voltage range vs. Li metal during a first charge at C/10 rate.

18. The powderous lithium metal oxide of claim 1, having a capacity versus voltage differential ratio dQ/dV<2000 mAh/g/V in the 4.40V to 4.70V voltage range vs. Li metal during a first discharge at C/10 rate.

19. The powderous lithium metal oxide of claim 2, wherein the lithium metal oxide has an electrical conductivity of less than $10^{-5}$ S/cm when pressed with 63.7 MPa at 25° C.

20. The powderous lithium metal oxide of claim 2, wherein the density of a relaxed pellet is greater than 3.7 g/cc after applying a pressure of 207 MPa on the powder.

* * * * *